June 1, 1965  E. W. ALLARDT ETAL  3,187,153
RESISTANCE WELDER
Filed July 17, 1962  3 Sheets-Sheet 1
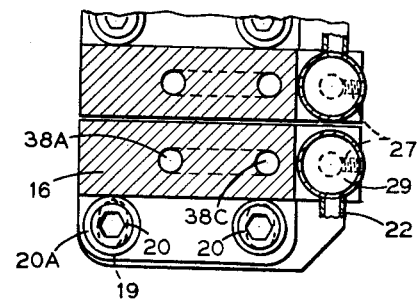
FIG. 3
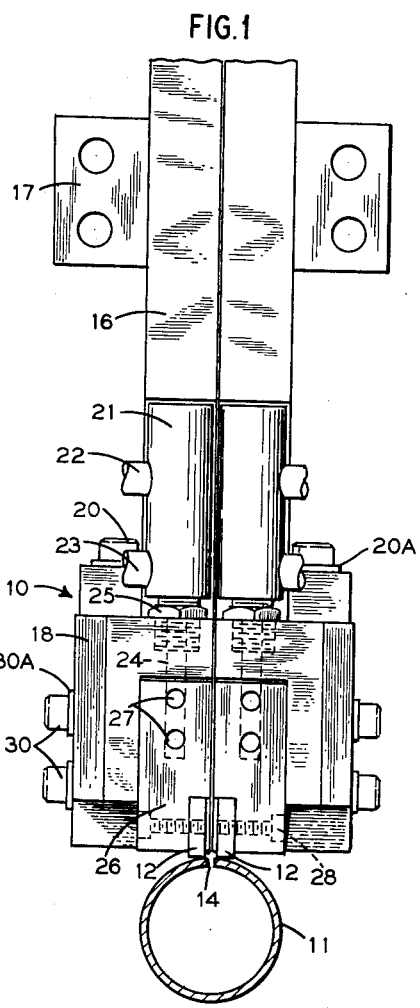
FIG. 1
FIG. 2
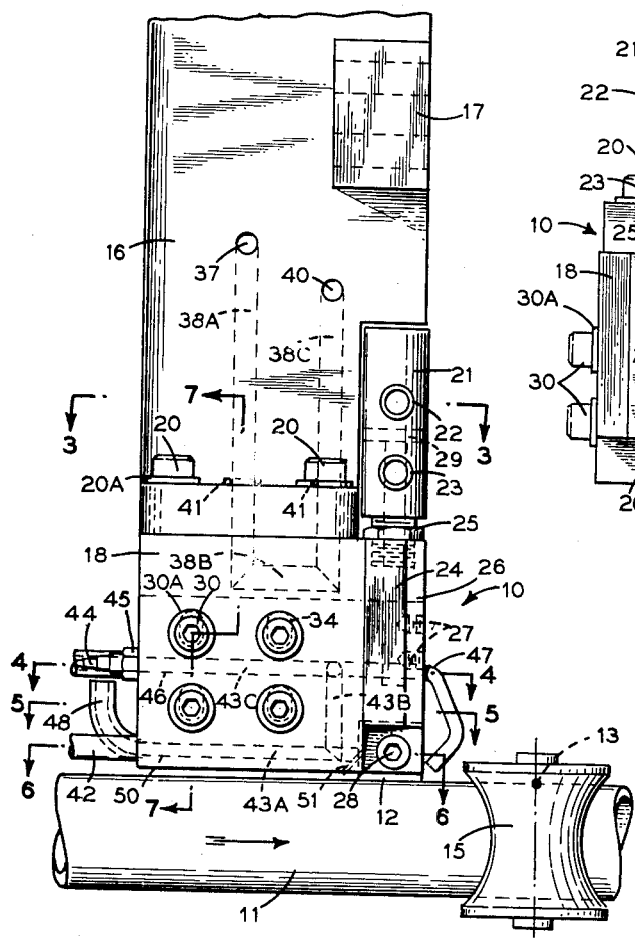
INVENTORS
Ernst W. Allardt
Harry B. Grunau
Daniel E. Yoho
BY *J. P. Moran*
ATTORNEY June 1, 1965  E. W. ALLARDT ETAL  3,187,153
RESISTANCE WELDER Filed July 17, 1962  3 Sheets-Sheet 2

INVENTORS
Ernst W. Allardt
Harry B. Grunau
Daniel E. Yoho

BY
ATTORNEY

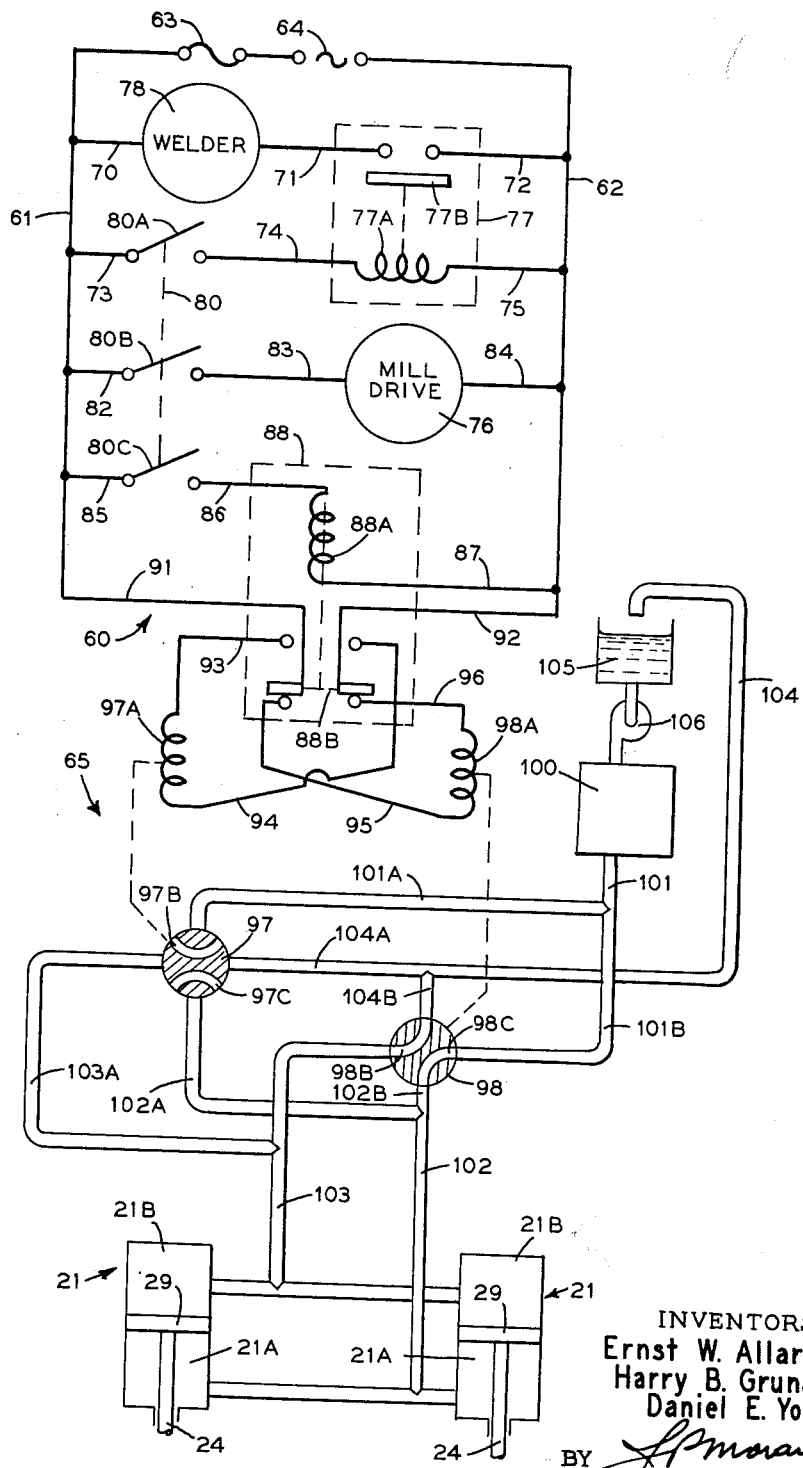

United States Patent Office 3,187,153
Patented June 1, 1965

3,187,153
RESISTANCE WELDER
Ernst W. Allardt, Harry B. Grunau, and Daniel E. Yoho, Alliance, Ohio, assignors to The Babcock & Wilcox Company, New York, N.Y., a corporation of New Jersey
Filed July 17, 1962, Ser. No. 210,445
8 Claims. (Cl. 219—65)

This invention relates to a method and apparatus for the welding of longitudinal seams in formed plate to produce metal tubing or for welding together two metal portions such as strips.

A means by which the welding can be accomplished is disclosed, for example, in U.S. Patents 2,818,488 and 2,898,440 by Rudd et al. These patents disclose a method and apparatus for welding together the edges of a metal plate, bent to generally circular cross section, defining a longitudinal gap in the metal tubing formed, and as the tubing is advanced longitudinally, applying pressure thereto to close the gap at a weld point. According to this method, the heating of the gap edges to welding temperature is effected by the use of electrodes, connected to a power source which are applied adjacent to the gap edges at points positioned in proximity to but in advance of the welding point, the current being of a frequency sufficiently high so that the lowest impedance path between the electrodes follows the gap edges to and from the weld point.

In the operation of the welding apparatus described above, it has been found that the portions of the electrodes in contact with the tube or workpiece, i.e., the electrode shoes, are subject to severe wear. This is both bothersome and expensive since the operation must be shut down to replace or readjust the electrodes.

It has also been found that the tube, in passing through the forming mill and the welding process, is subject to slight variations in shape and deviates slightly from true axial travel because of a combination of mechanical forces exerted by the forming rolls, thermal stresses due to the application of heat at the electrodes, and variations in the physical properties of the material, such as hardness and ductility. As a result, the electrode shoes may not follow precisely the changing shape of the formed tube as it enters the welding throat, and the requisite and effective contact between the shoes and the workpiece may occasionally be interrupted, thereby causing a defective weld. These undesirable conditions have been found especially in the welding of relatively large diameter tubes.

Several means of overcoming these difficulties as they relate to the resistances welding process have been previously attempted, most of them relying on a spring-loaded mechanism in combination with a split pivoted electrode to effect adjustment and maintain contact between the electrode shoes and the workpiece. The deficiencies in these self-adjusting electrode arrangements have been attributed to variations in contact pressure due to changes in spring resilience after considerable electrode wear, warpage and binding of the pivot mechanism due to its proximity to the heated workpiece, and excessive attenuation of electrical energy through the pivoted portion of the electrode due to inferior contact conditions at the pivot mechanism.

The present invention provides an apparatus for maintaining the electrode shoes in uniformity constant, effective contact with the workpiece and for continuously and normally adjusting the electrode shoes in relation to the workpiece to compensate for electrode wear. Further, the present invention provides these advantages without incurring the aforementioned disadvantages attributed to the previous apparatus intended for the same purpose. In addition, the present invention provides a method and apparatus for engaging and disengaging the electrode shoes with respect to the workpiece during the respective operations of starting and stopping the tube forming and welding mill.

The invention also provides means for cleaning of the workpiece surface in preparation for effecting surface contact with the electrode shoe and means for air blast cooling of the shoes.

In the present invention a formed metal tube, the longitudinal seam of which is to be welded, is continuously and rapidly advanced past a weld point. The gap edges of the metal tubing are purposely kept apart in advance of the weld point. Then, just prior to the initiation of welding, contacts having thereon imposed radio frequency current are slidably engaged with the exterior surface of the tube in the areas close to and on opposite sides of the gap, so that the greater part of the resulting current flow in the metal tubing is along the V-shaped path formed by the opposed edges of the tubing metal as the edges are about to come together at the point of welding. When using radio frequency current, the temperature of the edges of the tubing being formed will continue to increase even after the tubing has passed the contacts and will reach a maximum just as the edges are forced into contact by a pair of rollers at the weld point.

According to the present invention, the portions of the electrodes which contact the tube, i.e. the shoes, when brought into contact with the tube exterior surfaces in close proximity to the edges to be welded, are maintained at a continuously uniform pressure and in constant positive contact with the appropriate surfaces. Contact between the shoes and the workpiece may be initiated, maintained, or discontinued by the use of small hydraulic cylinders operated through a suitable pressurized control system. In this invention each electrode shoe is provided with a separate double-acting hydraulic cylinder so that it may be independently adjusted with respect to the tube.

To begin the operation, the tube forming mill drive is started and the electrodes are placed in contact with the workpiece by the hydraulic actuating system. Simultaneously, a time delay is initiated to allow the tube moving mechanism to accelerate the tube to the proper operating speed, after which the welding power is applied to the electrodes, which are in contact with the tube. Arcing between the tube and the electrode shoes is prevented by placing the electrode shoes in contact with the tube prior to the application of power to the electrodes. This is significant since, if the welding current were applied to the contact shoes before the shoes were in contact with the workpiece, the arcing which would result would damage or destroy the contact shoes. During operation, by supplying constant hydraulic pressure to the same ends of the cylinders that were used to bring the electrodes into contact with the workpiece, the shoes are maintained against the tube with a constant force, and positive contact is thereby insured. When the welding process is to be terminated, the shoes are removed from contact with the work surfaces by applying pressure to the opposite ends of the double-acting hydraulic cylinders.

Each electrode shoe is attached to a slidable or adjustable current-carrying member that is operated by its own hydraulic cylinder. The slidable member is limited to vertical movement in a relation to a fixed current-carrying member and a fixed position retainer plate by mating vertically disposed guide-ways on the slidable and fixed position current-carrying members. The slidable member is held in intimate current-carrying contact with the stationary member by means of spring pressure which constantly urges the fixed current-carrying member against the slidable current-carrying member. Efficient transfer of current between the members is further assured by "silvering" all of the current carrying surfaces of the electrode apparatus.

The various features of novelty which characterize the invention are pointed out with particularity in the claims annexed to and forming a part of this specification. However, for a better understanding of the invention, its operating advantages and specific objects attained by its use reference should be had to the accompanying drawings and descriptive matter in which are illustrated and described preferred embodiments of the invention.

Of the drawings:

FIGURE 1 is a front view of the adjustable electrode assembly showing its placement on a tube;

FIGURE 2 is a side view of the electrode assembly showing its relation to the tube;

FIG. 3 is a horizontal sectional view taken along line 3—3 of FIGURE 2;

FIGURE 9 is a schematic diagram of the combination electro-hydraulic control system.

In the various figures, like reference numerals designate like parts.

Figure 4:
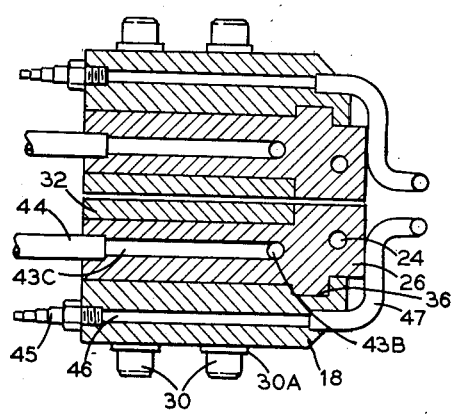
FIGURE 4 is a horizontal sectional view taken along line 4—4 of FIGURE 2.

With reference to FIGURES 1, 3, 4, 5, 6, and 7, all parts not designated by numerals have the same designation as their counterparts in the numbered mirror image of the parts.

In the drawings FIGURES 1 and 2, a pair of symmetrically positioned electrode assemblies 10, is shown in welding position with respect to the tube 11 which is being advanced longitudinally past the electrode assemblies 10 and the rollers 15 in the direction indicated by the arrow in FIGURE 2. The contact shoes 12 of the electrode assemblies 10 are in slidable contact with the tube 11 at a location in advance of the welding point 13. The longitudinal gap 14 in the tube 11 is closed at the welding point 13 by the exertion of lateral forces on the tube by a set of oppositely positioned stationary rollers 15, the vertical center lines of which are substantially in alignment with the welding point 13.

Each half of the electrode assembly is securely affixed to the frame of the stationary tube-forming mill (not shown) through a rigid member 16. The leads from a suitable power source (not shown) are attached to the lug 17 on the rigid member 16.

The fixed current-carrying member 18 is attached to the rigid member 16 by bolts 20. The bolts 20 are received in holes 19 which pass through the rigid member 16 and are appropriately tapped in the fixed current-carrying member 18 (see FIGURE 7). The portions of the holes 19 in the rigid member 16 are slotted in a direction transverse to the direcion of movement of the tube 11 so that the shoes 12 may be "toed in" to correspond to the V-shaped opposed edges of the tube 11. Washers 20A underlie the heads of the bolts 20 and cover the elongated portions of the holes 19.

Each of the rigid members 16 has affixed thereto a hydraulic cylinder 21 having therein an upper hydraulic pressure connection 22 and a lower hydraulic pressure connection 23. A piston rod 24 extends vertically downward through the bottom of the hydraulic cylinder 21 and is attached within the cylinder to a double-acting vertically movable piston 29 (see FIGURE 2) with travel restricted between the upper pressure connection 22 and the lower pressure connection 23. A seal gland 25, in the bottom end of cylinder 21, screwed into fixed current-carrying member 18, prevents leakages of hydraulic fluid through the opening in the bottom of the cylinder through which the piston rod 24 extends.

The piston rod 24 extends through the upper portion of the fixed current-carrying member 18 and is affixed to the movable current-carrying member 26 by set screws 27. A disposable contact shoe 12 is attached to the movable current-carrying member 26 by a bolt 28.

Figure 5:
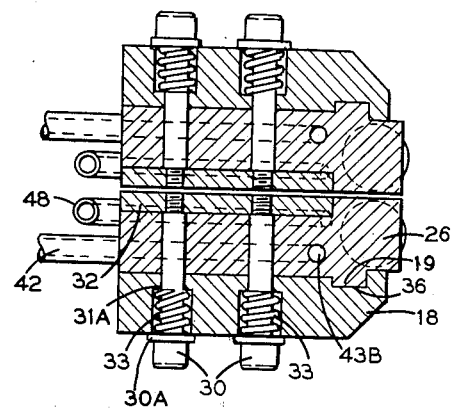
FIGURE 5 is a horizontal sectional view taken along line 5—5 of FIGURE 2.
Figure 7:
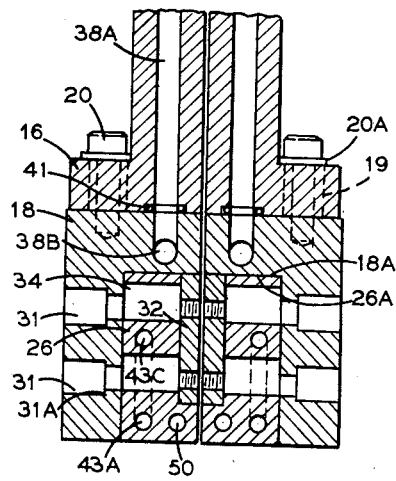
FIGURE 7 is a vertical sectional view taken along line 7—7 of FIGURE 2.

In the drawings FIGURES 5 and 7, the fixed current-carrying member 18 is shown to be held in contact with the movable current-carrying member 26 by bolts 30 inserted into bolt holes 31 which extend through members 18 and 26, and are threaded into tapped holes in the side retainer plate 32. The bolt holes 31 in the fixed current-carrying member 18 are counter-bored to accommodate coil springs 33, which seat on the inner ledge 31A of the recess and on the washer 30A under bolt 30, the retainer plate 32 thus being urged against the movable current-carrying member 26, and the fixed current-carrying member 18 being urged to contact the movable current-carrying member 26. As can best be seen in FIGURES 2 and 7, the movable current-carrying member 26 is provided with vertically elongated horizontal holes 34 through which the bolts 30 pass so that the vertical movement of the movable current-carrying member 26 is limited with respect to the fixed current-carrying member 18 and the fixed retainer plate 32. In FIGURE 7, the movable current-carrying member 26 is shown in its uppermost position with the top surface 26A of the movable current-carrying member 26 contacting the bottom surface 18A of the horizontal ledge portion of the fixed current-carrying member.

In the drawings FIGURES 4 and 5, a vertically extending longitudinal recess 36 is provided in the fixed current-carrying member 18, with a corresponding shoulder 19 formed on member 26 to limit the vertical movement of the movable current-carrying member 26 relative to the fixed current-carrying member 18 to a direction perpendicular to the axial movement of the tube 11 as it passes through the forming mill.

In the drawings FIGURES 2 and 7, the passageways for water and air cooling of the electrode assembly and the passageways for air blast cleaning of the tube surface are shown.

Water for cooling the fixed current-carrying member 18 is supplied from a suitable source (not shown) to a water inlet 37 in the member 16, from whence it flows downwardly through a passageway 38A in the rigid member 16 and member 18, to the horizontal passageway 38B in the fixed current-carrying member 18. It then flows upwardly through the vertical passageway 38C in members 18 and 16 respectively to the outlet 40 in the rigid member 16, which is suitably fitted with a discharge connection (not shown). The passageways, which extend vertically through members 16 and 18 are in alignment with O-rings 41 provided in the passageways 38A and 38C to prevent leakage of coolant at the contact surfaces of the rigid member 16 and the fixed current-carrying member 18.

Water for cooling the movable current-carrying member 26 is supplied to member 26 through a flexible line 42 from suitable outside sources (not shown) to the horizontal passageway 43A, flows upwardly through the vertical passageway 43B, then horizontally through the upper passageway 43C, and is received in and conveyed away to a drain by the flexible connecting line 44, as shown in FIGURES 2, 4, 5, and 6.

Figure 8:
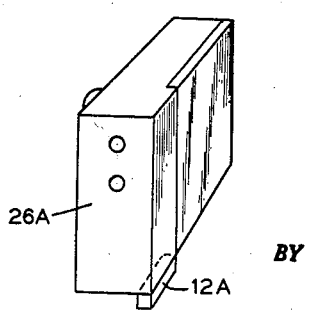
FIGURE 8 is an isometric view showing an alternate arrangement electrode shoe.

In the drawing FIGURE 8, a contact shoe 12A of the standard type generally used is shown attached to a movable current-carrying member 26A. Here the silver-tungsten-carbide alloy contact shoe is silver soldered to the movable current-carrying member 26A at the inner-face of these two members. It will be recognized that when the contact shoe 12A wears down, it will have to be replaced, and that this replacement is expensive, since it involves taking the welding apparatus out of service and dismantling the electrode assembly to perform the task of removing the worn shoe and replacing it with a new one.

In the drawings FIGURES 1 and 2, is shown a novel contact shoe 12 having four usable contact surfaces which is attached to the current-carrying member 26 by bolt 28. This contact shoe 12 is also preferably made of silver-tungsten-carbide alloy but, it is to be noted that it may advantageously be rotated after wear of one face to provide another new contact surface, thus making maximum use of the relatively expensive alloy material. The retaining bolt construction permits rotation of the shoe quickly with a minimum of labor and down time of the welder.

Air for cooling the contact shoes 12 is supplied under pressure from an external source (not shown) to the hose connector 45, shown in FIGURES 1 and 4. It flows through the passageway 46 in member 18 into the rigid tube 47 which terminates close to the contact shoe 12 and directs the cooling air toward the shoes 12.

Figure 6:
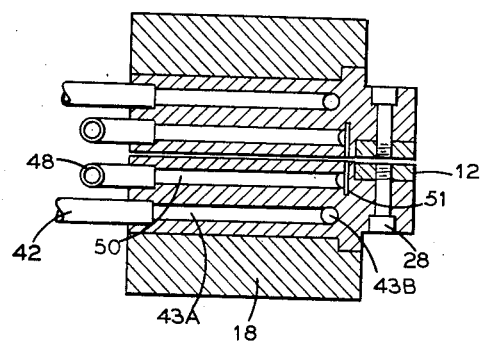
FIGURE 6 is a horizontal sectional view taken along line 6—6 of FIGURE 2.

Air blast cleaning of the tube surface prior to its coming into contact with the contact shoes 12 is provided by supplying air under pressure to the flexible line 48 shown in FIGURES 2 and 6. This air flows through horizontal passageway 50 in the movable current-carrying member 26 to a directional diversion slot 51 which directs the air toward the tube surfaces to be cleaned.

In the drawing FIGURE 9, is shown a schematic control diagram for exerting the electrode shoes into constant contact with the metal adjacent the tube edges, and for engaging and disengaging the electrode shoes to and from the workpiece. The control system is electrically operated and hydraulically actuated; however, it will be readily recognized that other types or combinations of operating and actuating systems may be employed to accomplish the same results.

In the drawing FIGURE 9, the electrical operating circuit 60 is shown in the upper portion of the drawing and the hydraulic actuating system 65 is in the lower portion.

In the electrical circuit 60, conductors 61 and 62 connect to a suitable low-voltage source of electricity 64 as for example, 110 volt 60 cycle. A fuse 63 is suitably supplied in the circuit.

The welder 78 is connected across the conductors 61 and 62 by conductors 70, 71, 72 and the switch portion 77B of the time-delay relay 77. The coil 77A of the time-delay relay 77 is connected across the conductors 61 and 62 by the conductors 73, 74, 75, and a pole 80A of the triple-pole single-throw switch 80. The mill drive or tube moving and forming mechanism 76 is also connected across the conductors 61 and 62 by pole 80B of the switch 80 and conductors 82, 83, and 84.

The coil 88A of the relay 88 is in parallel with the mill drive 76 and is connected between the conductors 61 and 62 by the conductors 85, 86, 87, and the pole 80C of the switch 80. When the switch 80 is open, as shown, the coil 88A is not energized and the two position switch 88B of the relay 88 remains in contact with conductors 95 and 96. The switch 88B is connected to conductors 61 and 62 by conductors 91 and 92, and when in the position shown, it allows energization of the coil 98A of the solenoid valve 98 through the conductors 95 and 96. When the pole 80C of the switch 80 is closed the coil 88A of the relay 88 is energized, the switch 88B breaks contact with conductors 95 and 96, makes contact with conductors 93 and 94, and the coil 97A of the solenoid valve 97 is energized.

It is obvious from the above description of the circuitry that when the switch 80 is open as shown, the welder and mill drive are not energized. Moreover, the switch 88B is in position allowing energization of coil 98A while the coil 97A is not energized.

Upon closing the switch 80, the mill drive 76 is started, the coil 88A of the relay 88 operates to cause the switch 88B to change positions, energizing conductors 93 and 94 and the coil 77A of the time-delay relay 77 is energized. Upon energization of the coil 77A a pre-set time delay is initiated, after expiration of which the switch 77B is closed and the power flows to the welder 78.

The hydraulic system 65 includes the four-way solenoid valves 97 and 98, a constant pressure hydraulic fluid reservoir 100, a return reservoir 105, an automatic pressure booster 106, connecting piping, and a pair of hydraulic cylinders 21. The piston rods 24 of the hydraulic cylinders 21, as previously described, are each connected to a movable current-carrying member 26 by set screws 27 (see FIGURES 1 and 2).

In the drawing FIGURE 9, the valve 98 is shown in the open-to-flow position and the valve 97 is shown in the closed-to-flow position. It will be understood from the above description of the electrical circuit 60 that whenever the low voltage source 64 is connected to the electrical circuit 60, the valves 97 and 98 will be in opposite positions, i.e., one open and one closed. In the following description it will become apparent that when valve 98 is open for flow (as shown in FIGURE 9), pistons 29 of the hydraulic cylinders 21 will be urged upward by the flow of hydraulic fluid into the lower cavities 21A of the hydraulic cylinders. Conversely, when the valve 97 is open, the pistons 29 of the hydraulic cylinders 21 will be urged downward by the flow of hydraulic fluid into the upper cavities of the hydraulic cylinders 21.

When, as in FIGURE 9, the valve 97 is closed and the valve 98 is open, hydraulic fluid is forced from the constant pressure reservoir 100 through the line 101 which branches into lines 101A and 101B. The fluid in line 101B flows through the port 98C into valve 98, into line 102B, into line 102, and thence into the lower chambers 21A of the hydraulic cylinders 21 causing pistons 29 to move upwardly. Simultaneously, the hydraulic fluid in the upper chambers 21B of the cylinders 21 is bled back to the return reservoir 105 through the lines 104B, and 104. Valve 97 is closed so there will be no flow therethrough.

The automatic booster 106 maintains the pressure at a constant, pre-determined level in the reservoir 100.

Although FIGURE 9 shows valve 97 closed, in its open position the port will assume a position similar to that shown for valve 98 which is shown in the open position. As already stated, when valve 98 is closed, valve 97 is open, and the hydraulic fluid then flows from the reservoir 100 via valve 97, through lines 101, 101A, 103A and 103 to the upper chambers 21B of the hydraulic cylinders 21. Simultaneously, the hydraulic fluid is bled from the lower chamber 21A of the cylinder 21 to the return reservoir 105 through the lines 102, 102A, and the valve port 97C of the valve 97, thence through lines 104A and 104.

It will be recognized from the above description that when the switch 80 is closed, the piston 29 connected to the piston rod 24 moves downward. When the switch 80 is then opened the pistons 29 in the hydraulic cylinders 21 will be raised without delay. It will be remembered that the piston rods 24 are attached to the movable current-carrying member 26 and that the contact shoes 12 are also attached to the movable current-carrying member 26. Thus, when the mill drive 76 is started, the contact shoes 12 are brought into contact with the tube 11 and after the pre-set time delay which allows the mill drive to accelerate the tube being formed to its normal operating speed, the power is transmitted to the welder 78. Conversely, when the switch 80 is open the contact shoes 12 are immediately withdrawn from contact with the tube 11, the mill drive stops, and the welder power is cut off without delay.

During operation the contact shoes 12 are constantly and independently urged in a direction normal to and into contact with the respective edges of the gap 14 in the tube 11 by the pressure of the hydraulic fluid in the upper chamber 21B of the hydraulic cylinder 21. By this method it may be seen that positive, uniformly applied contact between each of the shoes 12 and the appropriate portions of the tube 11 is insured even when the tube 11 deviates from true axial movement. The positive contact of the shoes 12 on the tube 11 will produce optimum uniformity in the weld seam, constantly adjust the contact shoes 12 to compensate for wear, and thus minimize weld seam reject portions.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of the other features.

What is claimed is:

1. Apparatus for welding together a pair of metallic strip edges defining therebetween a longitudinal gap comprising means for longitudinally advancing said strips, means for applying pressure thereto to close said gap at a welding point, a pair of electrodes mounted to slidably engage said strips adjacent said gap edges at positions in advance of said welding point, means for urging said electrodes into engagement with said strips with substantially equal and constant force, each of said electrodes including a fixed current carrying member and a movable current carrying member, said movable member being slidably engaged with said fixed member and having mounted thereon a contact surface, and means for applying a radio frequency current to said fixed current carrying member portions of said electrodes whereby current flows from said fixed members, through said movable current carrying members containing said contact surfaces, and along said gap edges to and from said welding point, so that the resistance heating effect of said current is concentrated in the approaching gap edges.

2. Apparatus for welding together a pair of metallic strip edges defining therebetween a longitudinal gap comprising means for longitudinally advancing said strips, means for applying pressure thereto to close said gap at a welding point, a pair of electrodes mounted to slidably engage said strips adjacent said gap edges at positions in advance of said welding point, means connecting said electrodes to a source of radio frequency current, each of said electrodes including a fixed current carrying member and a movable current carrying member, said movable member being slidably engaged with said fixed member and having mounted thereon a contact surface, and fluid-operated cylinder means compelling continuous urgement of said movable member in a direction substantially normal to the strip contact area for continuously engaging said contact surfaces with said strips.

3. Apparatus for welding together the edges defining a longitudinal gap in metal tubing comprising means for longitudinally advancing said tubing, means for applying pressure thereto to close said gap at a welding point, a pair of electrodes mounted to slidably engage said tubing adjacent said gap edges at positions in advance of said welding point, means connecting said electrodes to a source of radio frequency current, each of said electrodes including a fixed current carrying member and a movable current carrying member, said movable member being slidably engaged with said fixed member and having mounted thereon a contact surface, means compelling continuous urgement of said movable members in a direction substantially normal to the tube contact area for continuously engaging said contact surfaces with said tubing, and mating guide means on said fixed current carrying member and said movable current carrying member for restricting movement to said direction.

4. Apparatus for welding together the edges defining a longitudinal gap in metal tubing comprising means for longitudinally advancing said tubing, means for applying pressure thereto to close said gap at a welding point, a pair of electrodes mounted to slidably engage said tubing adjacent said gap edges at positions in advance of said welding point, means connecting said electrodes to a source of radio frequency current, each of said electrodes including a fixed current-carrying member and a movable current-carrying member, said movable current-carrying member being in planar sliding engagement with said fixed member and having mounted thereon a contact surface, and spring means for maintaining said movable member in electrically conductive engagement with said fixed member.

5. Apparatus for welding together the edges defining a longitudinal gap in metal tubing comprising means for longitudinally advancing said tubing, means for applying pressure thereto to close said gap at a welding point, a pair of electrodes mounted to slidably engage said tubing adjacent said gap edges at positions in advance of said welding point, means connecting said electrodes to a source of radio frequency current, each of said electrodes including a fixed current carrying member and a movable current carrying member, said movable member being slidably engaged with and urged toward said fixed member and having mounted thereon a contact surface, coolant passageways inside said fixed current carrying member and said movable current carrying member, means for circulating coolant in said passageways, air blast passages within said electrodes, and means for forcing air through said passages to conduct heat away from said contact surfaces and to clean the tube surface prior to contact with said contact surfaces.

6. Apparatus for welding together a pair of strip edges defining therebetween a longitudinal gap comprising means for horizontally and axially moving said edges, means for applying pressure thereto to close said gap at a welding point, said strips being subject to slight deviations from strict axial travel, a pair of electrode assemblies having thereon a pair of contact surfaces arranged to slidably engage said strips at contact areas on opposite sides of said gap at positions in advance of said welding point, each of said electrode assemblies including a fixed current carrying member and a movable current carrying member having one of said contact surfaces mounted thereon, said movable member being slidably engaged with and urged toward said fixed member in electrically conductive engagement, a fluid operated cylinder connected between said fixed member and said movable member for effecting movement of said movable member, pressure control means normally operative for maintaining constant pressure within said cylinders whereby said contact surfaces are independently urged into engagement with said strips with substantially equal and constant force, and means for applying a radio frequency current to said fixed members whereby current flows through said movable members and said contact surfaces along said gap edges to and from said welding point, the resistance heating effect of said current being concentrated in the approaching gap edges.

7. Apparatus for welding together the edges defining a longitudinal gap in a metal tube comprising means for horizontally and axially moving said tube, means for applying pressure thereto to close said gap at a welding point, a pair of electrode assemblies having a pair of contact surfaces arranged to slidably engage said tube at contact areas on opposite sides of said gap at positions in advance of said welding point, each of said electrode assemblies including a fixed current carrying member and a movable current carrying member having one of said contact surfaces mounted thereon, said movable member being slidably engaged with said fixed member, means operative between said movable member and said fixed member for maintaining said members in electrically conductive engagement with each other, mating guide means on said fixed member and said movable member for restricting relative movement of said movable member to a direction substantially normal to the tube contact area, a fluid operated cylinder connected between said fixed member and said movable member for effecting movement of said movable member, pressure control means normally operative for maintaining constant pressure within said cylinders whereby said contact surfaces are independently urged into engagement with said tube with substantially equal and constant force, and means for applying a radio frequency current to said fixed members whereby current flows through said movable members and said contact surfaces along said gap edges to and from said welding point, the resistance heating effect of said current being concentrated in the approaching gap edges to heat said edges to welding temperature.

8. Apparatus for welding together the edges defining a longitudinal gap in a metal tube comprising means for horizontally and axially moving said tube, means for applying pressure thereto to close said gap at a welding point, said tube being subject to slight deviations from strict axial travel, a pair of electrode assemblies mounted above said tube and having a pair of contact surfaces arranged to slidably engage said tube at contact areas on opposite sides of said gap at positions in advance of said welding point, each of said electrode assemblies including a fixed current carrying member and a movable current carrying member having one of said contact surfaces mounted thereon, said movable member being slidably engaged with said fixed member, spring means operative between said movable member and said fixed member for maintaining said members in electrically conductive engagement with each other, mating guide means on said fixed member and said movable member for restricting relative movement of said movable member to a direction substantially normal to the tube contact area, a fluid operated cylinder connected between said fixed member and said movable member for effecting movement of said movable member, control means operatively associated with said cylinders for selectively raising and lowering said movable members whereby said contact surfaces are respectively disengaged and engaged with said tube, pressure control means normally operative for maintaining constant pressure within said cylinders whereby said contact surfaces are independently urged into engagement with said tube with substantially equal and constant force, and means for applying a radio frequency current to said fixed members whereby current flows through said movable members and said contact surfaces along said gap edges to and from said welding point, the resistance heating effect of said current being concentrated in the approaching gap edges to heat said edges to welding temperature.

References Cited by the Examiner

UNITED STATES PATENTS

| | | | |
|---|---|---|---|
| 1,999,805 | 4/35 | Dyer | 219—59 |
| 2,236,707 | 4/41 | Darner et al. | 219—84 |
| 2,774,857 | 12/56 | Rudd et al. | 219—67 |
| 2,794,108 | 5/57 | Park | 219—59 |

FOREIGN PATENTS 320,171   8/34   Italy.

RICHARD M. WOOD, *Primary Examiner.*